United States Patent
Harima et al.

(10) Patent No.: US 10,486,607 B2
(45) Date of Patent: Nov. 26, 2019

(54) DOOR STRUCTURE FOR VEHICLE STORAGE SECTION

(71) Applicants: Toyota Jidosha Kabushiki Kaisha, Toyota-shi, Aichi-ken (JP); Toyoda Gosei Co., Ltd., Kiyosu-Shi, Aichi-Ken (JP)

(72) Inventors: Kazunori Harima, Kariya (JP); Naoko Shimizu, Nisshin (JP); Kenji Ushida, Nagoya (JP); Masanori Mizuno, Kiyosu (JP); Kimitoshi Imura, Kiyosu (JP)

(73) Assignees: Toyota Jidosha Kabushiki Kaisha, Toyota-shi, Aichi-ken (JP); Toyoda Gosei Co., Ltd., Kiyosu-Shi, Aichi-Ken (JP)

( * ) Notice: Subject to any disclaimer, the term of this patent is extended or adjusted under 35 U.S.C. 154(b) by 105 days.

(21) Appl. No.: 15/870,408

(22) Filed: Jan. 12, 2018

(65) Prior Publication Data
US 2018/0251075 A1 Sep. 6, 2018

(30) Foreign Application Priority Data
Mar. 2, 2017 (JP) ................. 2017-039614

(51) Int. Cl.
*B60R 7/06* (2006.01)
*E05B 83/30* (2014.01)
*E05B 79/06* (2014.01)

(52) U.S. Cl.
CPC .............. *B60R 7/06* (2013.01); *E05B 79/06* (2013.01); *E05B 83/30* (2013.01)

(58) Field of Classification Search
CPC ... B60R 7/04; B60R 7/06; E05B 79/06; E05B 83/30
USPC ..................... 296/37.1, 37.8, 37.12
See application file for complete search history.

(56) References Cited

U.S. PATENT DOCUMENTS

| 5,868,448 | A | * | 2/1999 | Izumo | B60R 7/06 |
| | | | | | 217/60 C |
| 9,067,540 | B2 | | 6/2015 | Watanabe et al. | |
| 2016/0010368 | A1 | * | 1/2016 | Tanoguchi | E05B 79/06 |
| | | | | | 16/412 |
| 2018/0298649 | A1 | * | 10/2018 | Nakasone | E05B 83/30 |

FOREIGN PATENT DOCUMENTS

| JP | 2008002118 A | 1/2008 |
| JP | 2012246727 A | 12/2012 |
| JP | 201494722 A | 5/2014 |

* cited by examiner

*Primary Examiner* — Jason S Daniels
(74) *Attorney, Agent, or Firm* — Dinsmore & Shohl LLP

(57) ABSTRACT

A hole for handle placement penetrates through an outer door, and a handle attached to a fascia face side of a base of a handle unit is placed in the hole in the outer door. An engagement claw is formed at a position on the back-face side of the outer door. An engagement hole to engage with the engagement claw penetrates the base of the handle unit. A pair of left and right hooks are formed at the base of the handle unit, and a pair of left and right hook anchors are formed to the back-face side of the outer door, with the pair of left and right hooks anchoring into the pair of left and right hook anchors.

4 Claims, 16 Drawing Sheets

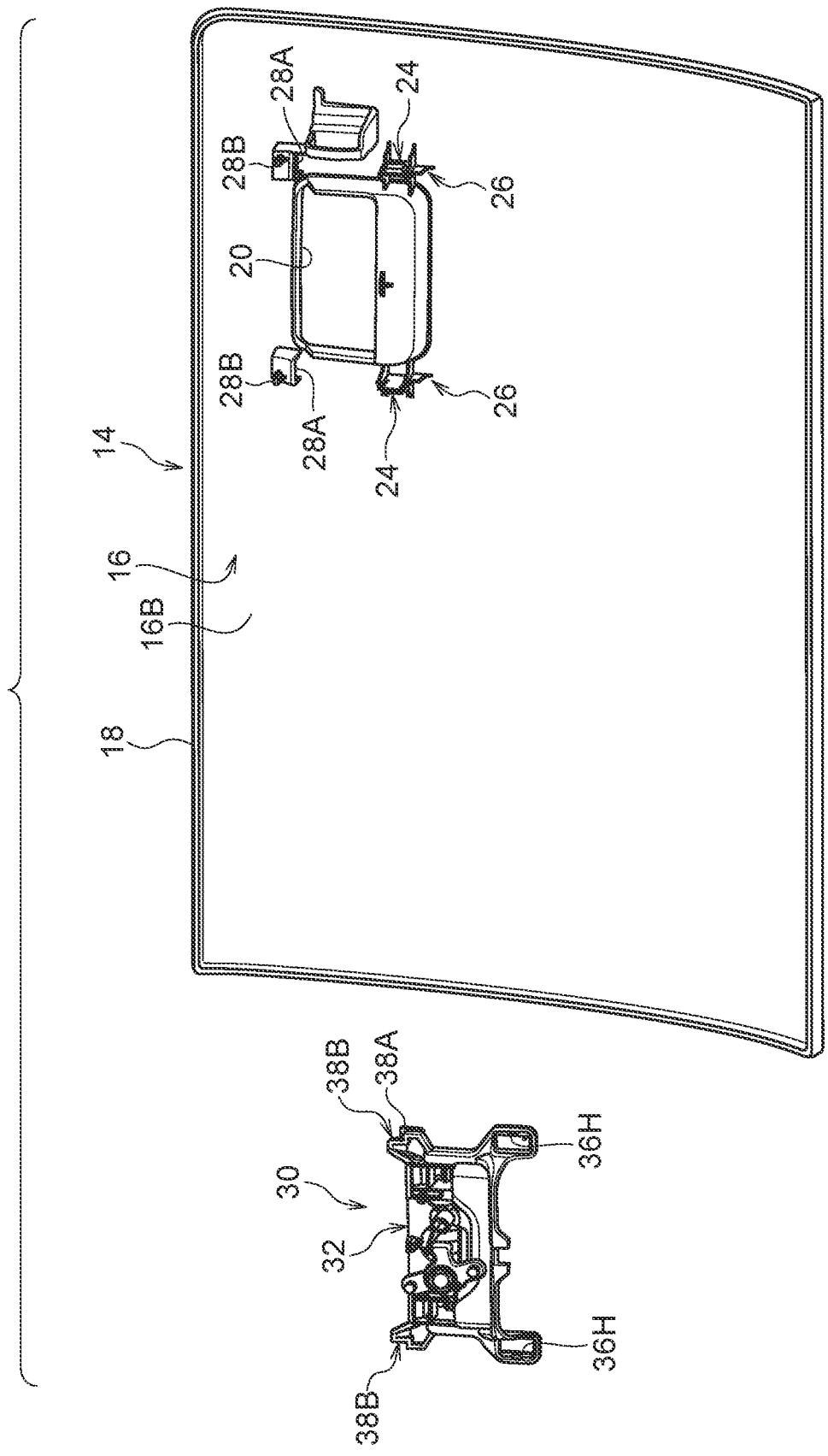

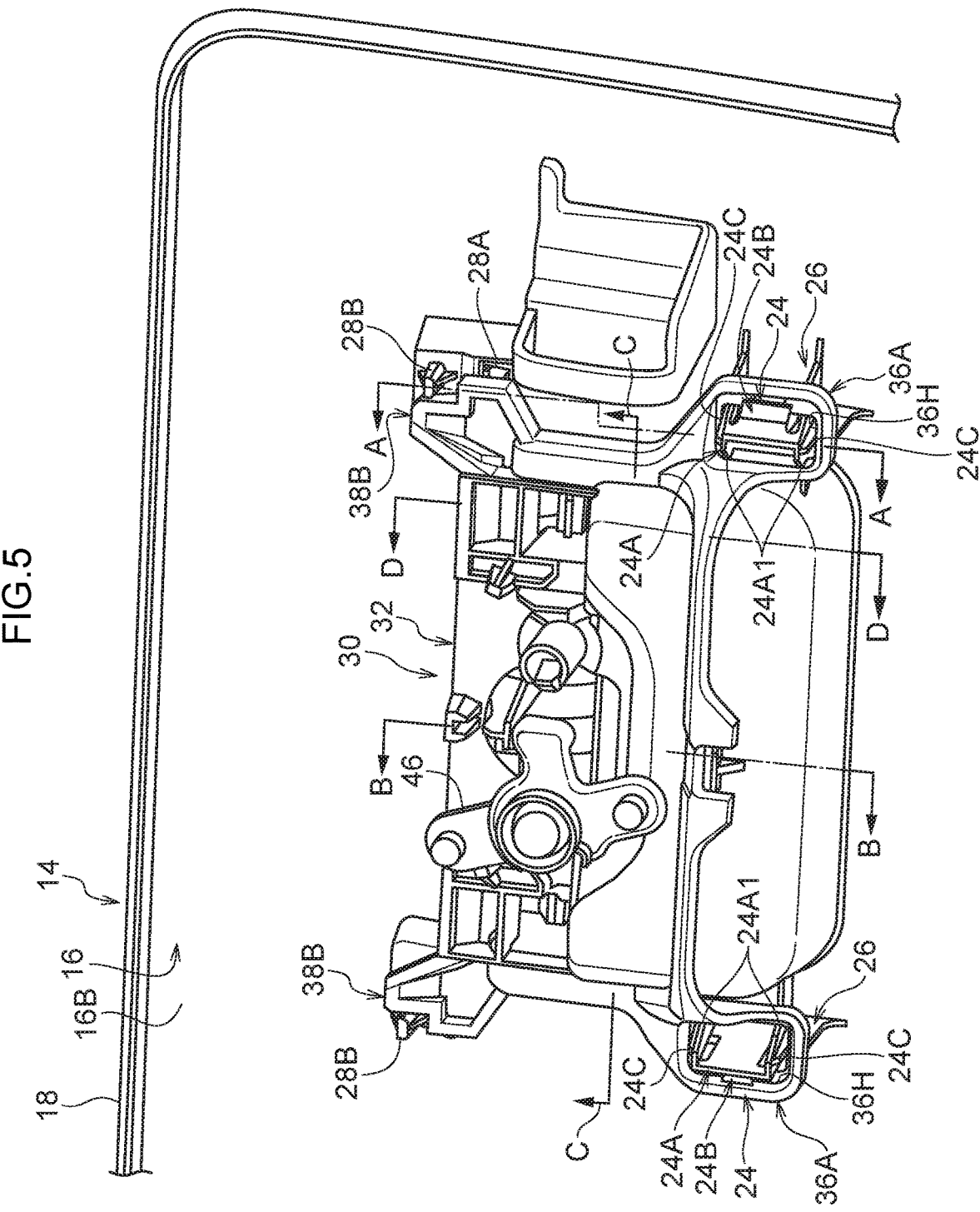

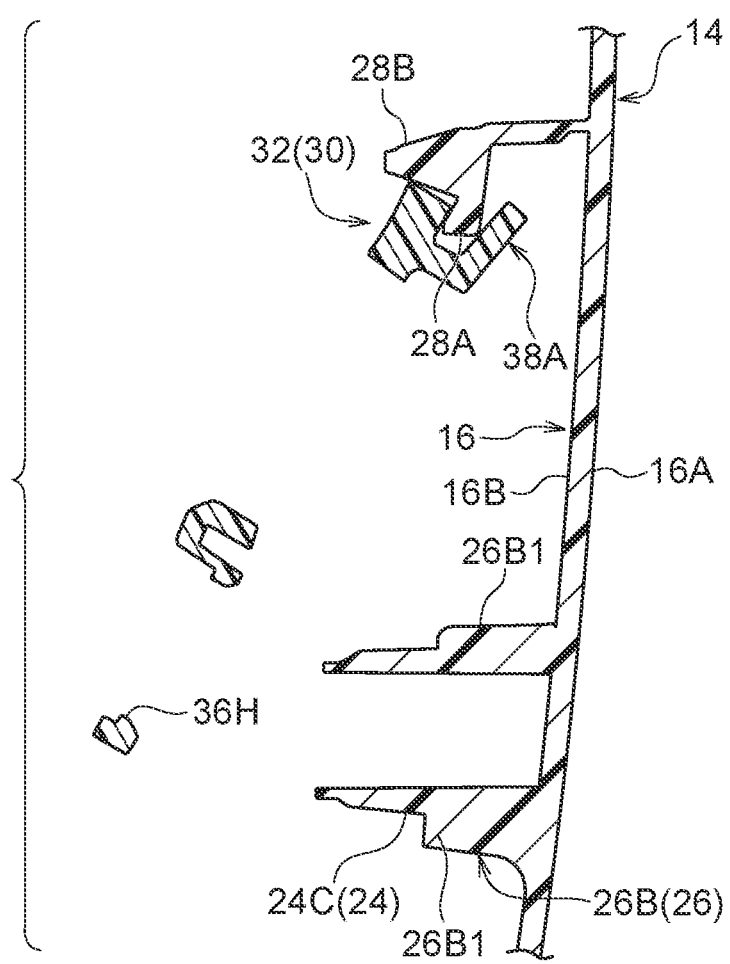

DOOR STRUCTURE FOR VEHICLE STORAGE SECTION

CROSS-REFERENCE TO RELATED APPLICATION

This application is based on and claims priority under 35 USC 119 from Japanese Patent Application No. 2017-039614 filed on Mar. 2, 2017, the disclosure of which is incorporated by reference herein.

TECHNICAL FIELD

The present disclosure relates to a door structure for a vehicle storage section.

BACKGROUND ART

Japanese Patent Application Laid-Open (JP-A) No. 2012-246727 (Patent Document 1) describes technology related to a vehicle glovebox that includes a handle unit. To explain in brief, in this related art, a window section is formed in a fascia panel of the glovebox, and a placement recess, configured with an L-shape in side cross-section view, is formed at the back side of the window section. During assembly of the handle unit, the handle unit is inserted into the window section from a design-face side of the fascia panel, and a base member of the handle unit is fixed from the back-face side to a vertical wall of the placement recess using screws. Thus, in this related art, the screws cannot be seen from the design-face side, and so the quality of the external appearance at the design-face side is not detrimentally affected by the screws.

However, in the case of the related art above, it is necessary to flip the glovebox over during assembly of the handle unit, since the base member of the handle unit is fixed to the vertical wall using screws from the back-face side of the fascia panel after first inserting the handle unit into the window section from the design-face side of the fascia panel. There is accordingly a concern that the assembly time to assemble the handle unit to the fascia panel is increased.

SUMMARY

In consideration of the above circumstances, an object of the present disclosure is to obtain a door structure for a vehicle storage section in which the door structure is capable of reducing assembly time to assemble a handle unit to a door panel.

In a door structure for a vehicle storage section according to a first aspect, the door structure includes a door panel and a handle unit. The door panel is provided at an opening and closing section of the vehicle storage section, and includes a hole for handle placement penetrating through the door panel. The handle unit includes a handle that is configured to be disposed in the hole of the door panel, and a base that supports the handle. Moreover, an engagement claw is formed at one of a location on a back-face side of the door panel or the base of the handle unit, and an engagement hole that engages with the engagement claw penetrates through the other of the location on a back-face side of the door panel or the base of the handle unit.

According to the above configuration, the hole for handle placement is formed penetrating through the door panel provided at the opening and closing section of the vehicle storage section, and the handle is configured to be disposed in the hole of the door panel supported by the base of the handle unit. The engagement claw is formed to one out of a location on a back-face side of the door panel or the base of the handle unit, and the engagement hole that engages with the engagement claw is formed penetrating through the other out of the location on a back-face side of the door panel or the base of the handle unit. This enables the handle unit to be assembled from the back-face side of the door panel during assembly of the handle unit onto the door panel without needing to flip over the door panel.

A vehicle storage section door structure according to a second aspect is the first aspect, wherein a pair of left and right hooks are formed at the base of the handle unit, and a pair of left and right hook anchors that anchor the pair of left and right hooks are formed on a back-face side of the door panel. Moreover, the handle unit is configured so as to be able to be rotationally moved while hooking the pair of left and right hooks into the pair of left and right hook anchors, and such that anchoring the hooks in the hook anchors in an assembled orientation positions the handle unit in at least an extending direction of the door panel with respect to the door panel, as viewed from a side face of the door.

According to the above configuration, the pair of left and right hooks are formed on the base of the handle unit, and are anchored in the pair of left and right hook anchors formed on the back-face side of the door panel. Further, the handle unit is configured so as to be able to be rotationally moved while hooking the pair of left and right hooks into the pair of left and right hook anchors, and such that anchoring the hooks in the hook anchors in an assembled orientation positions the handle unit in at least the extending direction of the door panel with respect to the door panel, as viewed from a side face of the door. Namely, when assembling the handle unit to the door panel, the handle unit can be assembled to the door panel by rotationally moving the handle unit while hooking the pair of left and right hooks into the pair of left and right hook anchors, thereby giving good assembly operation performance.

A vehicle storage section door structure according to a third aspect is the second aspect, wherein a pair of left and right projections are formed on the back-face side of the door panel, the pair of left and right projections being integrally provided to each of the pair of left and right hook anchors and projecting out in a direction toward the side away from the back face of the door panel. Moreover, a pair of left and right overhang portions are formed at the base of the handle unit, the pair of left and right overhang portions being integrally provided at each of the pair of left and right hooks, and being disposed between the pair of left and right projections and adjacent to the respective projection of the pair of left and right projections. Moreover, the handle unit is positioned in a door left-right direction with respect to the door panel by the pair of left and right projections restricting displacement of the pair of left and right overhang portions in the door left-right direction.

In the above configuration, the projections are formed on the back-face side of the door panel as a left-and-right pair. The projections are integrally provided to the respective hook anchors of the pair of left and right hook anchors, and project out in a direction toward the side away from the back face of the door panel. By contrast, the overhang portions are formed to the base of the handle unit as a left-and-right pair. The pair of left and right overhang portions are integrally provided to the respective hook of the pair of left and right hooks, and are disposed between the pair of left and right projections and adjacent to the respective projection of the pair of left and right projections. Moreover, configuration is such that the handle unit is positioned in a door left-right direction with respect to the door panel by the pair of left and right projections restricting displacement of the pair of left and right overhang portions in the door left-right direction. Thus, when assembling the handle unit to the door panel, the pair of left and right overhang portions are disposed between the pair of left and right projections, which are easy to see from the back side of the door panel, enabling the hooks to be hooked into the hook anchors and the handle unit to be positioned in the door left-right direction with respect to the door panel.

A vehicle storage section door structure according to a fourth aspect is any one of the first to the third aspect, wherein the handle is supported so as to be capable of swinging with respect to the base about an axis running along a door left and right direction, and the handle is set so as to swing in a direction of pulling up when opening the door. Moreover, the engagement claw is formed at a location on the back-face side of the door panel, and the engagement claw is further toward a vehicle lower side than a rotation axis of the handle. Moreover, a base section is formed on the back-face side of the door panel, the base section connecting a general section of the door panel and the engagement claw together and including a location to contact a peripheral edge of the engagement hole.

According to the above configuration, the handle is capable of swinging in a direction of pulling up about an axis running along the door left and right direction when the door is opened. Moreover, the engagement claw is formed at a location on the back-face side of the door panel, and the engagement claw is set further to the vehicle lower side than a rotation axis of the handle. The base section is formed on the back-face side of the door panel, the base section connecting the general section of the door panel and the engagement claw together and including a location to contact the peripheral edge of the engagement hole. Thus, when the handle is pulled up about the axis running along the door left-right direction, load acts on the base section in a pressing direction from the peripheral edges of the engagement hole of the handle unit. Thus, as a result of providing the base section, the door panel is less liable to deform under load in the pressing direction and durability is improved compared to cases in which the base section is not provided.

A vehicle storage section door structure according to a fifth aspect is the fourth aspect when depending from the second aspect, or the fourth aspect when depending from the third aspect, wherein the hooks are further toward a vehicle upper side than the rotation axis of the handle, and a distance from the rotation axis of the handle to the hook anchors is shorter than a distance from the rotation axis of the handle to the base section.

According to the above configuration, in cases in which the handle is pulled up about the rotation axis, load from the peripheral edge of the engagement hole of the handle unit acting on the base section of the door panel can be made larger than the load from the hooks of the handle unit acting on the hook anchors of the door panel. Accordingly excessive load can be suppressed from acting on the hooks and the hook anchors.

As explained above, the vehicle storage section door structure of the present disclosure has the excellent effect of enabling a reduction in assembly time to assemble a handle unit to a door panel.

BRIEF DESCRIPTION OF DRAWINGS

FIG. 2 is an exploded perspective view illustrating an outer door and a handle unit of the glovebox illustrated in FIG. 1, in a disassembled state as viewed from a back-face side.

FIG. 5 is a perspective view illustrating the handle unit of FIG. 3B, in a state assembled to the outer door in FIG. 4A.

FIG. 7A is a vertical cross-section illustrating a displacement state of the handle unit when the handle unit is being assembled to an outer door, shown in a state sectioned along a cross-sectional position corresponding to line A-A in FIG. 5, and illustrates a state of attempting to rotationally move the handle unit while hooking hooks into hook anchors.

DETAILED DESCRIPTION

Figure 1:
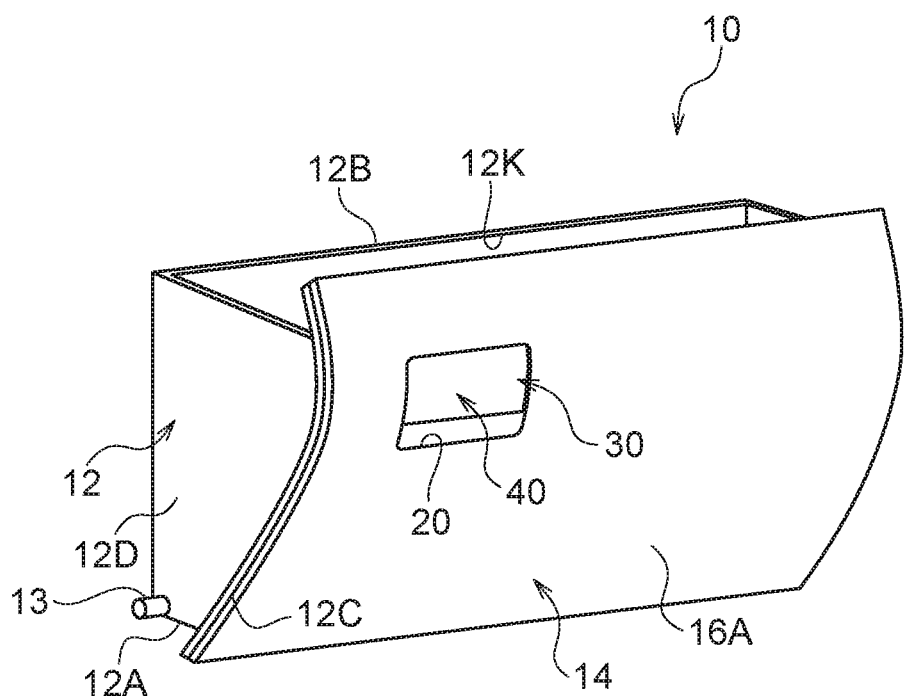
FIG. 1 is a perspective view illustrating a glovebox that has been applied with a vehicle storage section door structure according to an exemplary embodiment of the present disclosure.

Explanation follows regarding a door structure of a vehicle storage section according to an exemplary embodiment of the present disclosure, with reference to FIG. 1 to FIG. 11. FIG. 1 is a perspective view illustrating a glovebox applied with the vehicle storage section door structure according to the present exemplary embodiment. Note that in the below explanation, unless specifically stated otherwise, simple reference to the up-down direction refers to up and down when viewing the glovebox face-on, and unless specifically stated otherwise, simple reference to the left-right direction refers to left and right when viewing the glovebox face-on.

Exemplary Embodiment Configuration

A glovebox 10 serving as the vehicle storage section illustrated in FIG. 1 is installed on a front-passenger-seat-facing side of an instrument panel, which is disposed at a vehicle cabin front section and not illustrated in the drawings. The glovebox 10 is loadable/unloadable through an opening in the instrument panel. As an example, in the present exemplary embodiment, the glovebox 10 has an integrated structure composed of a door panel section and a box section for putting small objects in. Namely, the glovebox 10 includes a resin box body 12 that has a box shape and that is disposed such that an opening 12K faces upward. The glovebox 10 also includes a resin outer door 14 that is attached to the vehicle-cabin side of the box body 12 and that serves as a door panel.

The box body 12 includes a bottom wall 12A, a front wall 12B, a rear wall 12C, and left and right side walls 12D. The front wall 12B is provided extending upwards from a vehicle front edge of the bottom wall 12A, and the rear wall 12C is configured including a location provided extending upwards from a vehicle rear edge of the bottom wall 12A. The rear wall 12C is an element that may also be thought of as an inner door. The outer door 14 disposed on the vehicle-cabin side is attached to the rear wall 12C. A handle unit 30, described later, and the like are disposed between the rear wall 12C and the outer door 14.

Further, the left and right side walls 12D are provided extending upwards from respective left and right edges of the bottom wall 12A, and connect the two left and right edges of the front wall 12B to locations in the vicinity of the two left and right edges of the rear wall 12C. Shafts 13 projecting out to the outer sides of the box body 12 are formed at locations at lower front ends of respective outer faces of the left and right side walls 12D. The shafts 13 are axially supported by shaft bearings, not illustrated in the drawings, on the vehicle-body side, with their axial direction in the vehicle width direction. Namely, as an example, in the present exemplary embodiment, the glovebox 10 is configured so as to be loaded/unloaded through the opening in the instrument panel by pivoting the glovebox 10 about the shafts 13. Note that the glovebox 10 may adopt a configuration in which, instead of the shafts 13, rails with their length direction in the vehicle front-rear direction are attached to the outer faces of the left and right side walls 12D, with the rails disposed so as to be capable of sliding in the vehicle front-rear direction along guide portions (not illustrated in the drawings) provided at the inside of the instrument panel. In such a configuration, the glovebox (10) is loaded/unloaded through the opening of the instrument panel by sliding the glovebox (10) in the vehicle front-rear direction.

The outer door 14 is provided at an opening and closing section of the glovebox 10 and configures a design face 16A of the glovebox 10. FIG. 2 is an exploded perspective view illustrating the outer door 14 and the handle unit 30, described later, in a state as viewed from the back-face side. As illustrated in FIG. 2, the outer door 14 is formed in a substantially rectangular tray shape. The outer door 14 includes an outer door general section 16 serving as a substantially rectangular flat plate shaped general section configuring the design face 16A (see FIG. 1), and an outer door peripheral wall 18 raised from the four outer peripheral edges on a back face 16B side of the outer door general section 16, on the opposite side to the design face 16A (see FIG. 1) side. A peripheral end of the rear wall 12C of the box body 12 illustrated in FIG. 1, described above, is joined to the outer door peripheral wall 18.

Figure 4A:
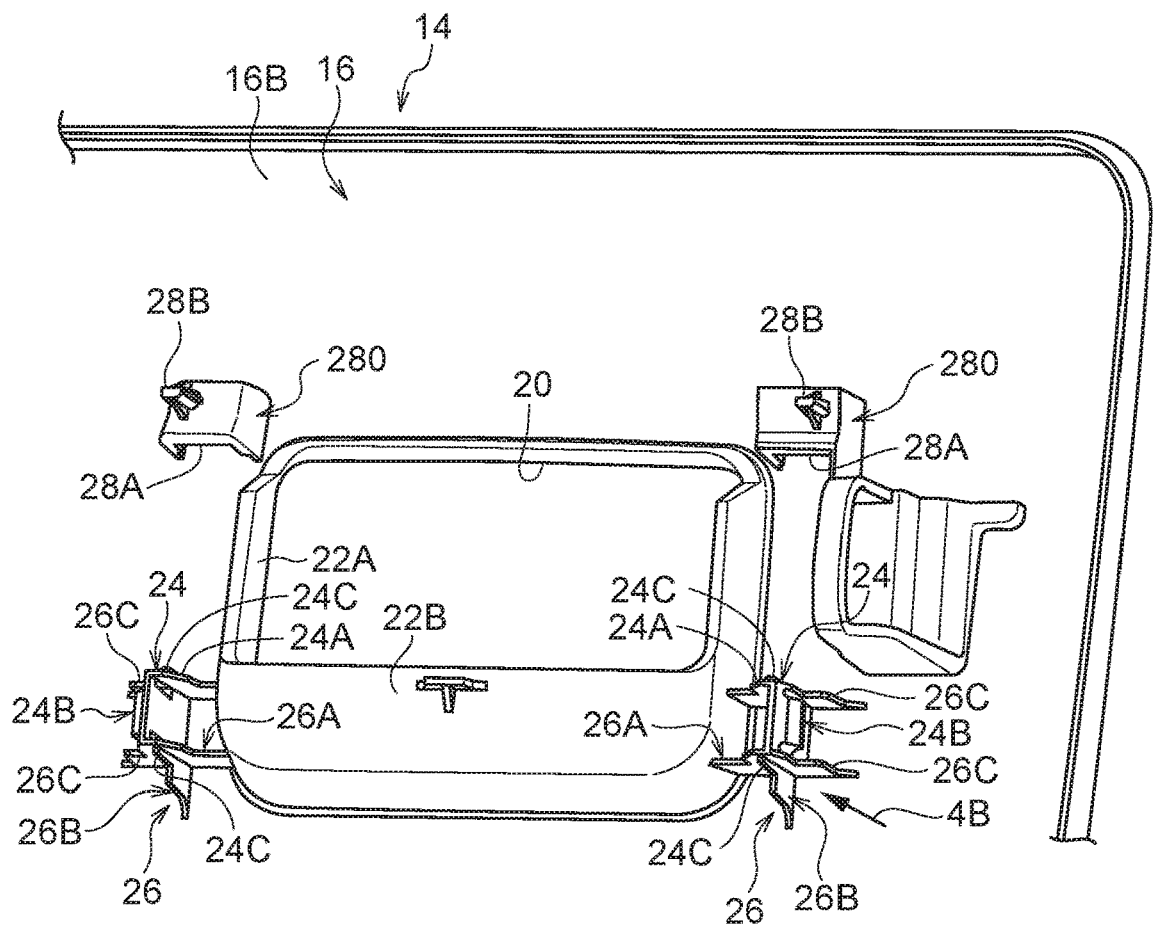
FIG. 4A is a perspective view illustrating a hole section for handle placement and the surroundings of the hole section on the outer door of FIG. 2, in a state as viewed from a back-face side.

A handle placement hole 20 is formed penetrating through an upper section of the outer door 14. FIG. 4A is a perspective view illustrating the handle placement hole 20 of the outer door 14 and the surroundings of the handle placement hole 20, in a state as viewed from the back face 16B side of the outer door 14. As illustrated in FIG. 4A, on the back face 16B side of the outer door 14, a peripheral wall 22A is raised from the edges of the handle placement hole 20. The projection amount of the peripheral wall 22A projecting out from each location along the two left and right edges and the lower edge of the hole 20 is set larger than the projection amount of the peripheral wall 22A projecting out from the location along the upper edge of the hole 20. Further, lower portions of both sides of the peripheral wall 22A and the lower end side of the peripheral wall 22A are connected together by a vertical-wall shaped coupling wall 22B. The rigidity of the edges of the hole 20 is raised by the peripheral wall 22A and the coupling wall 22B.

Figure 3A:
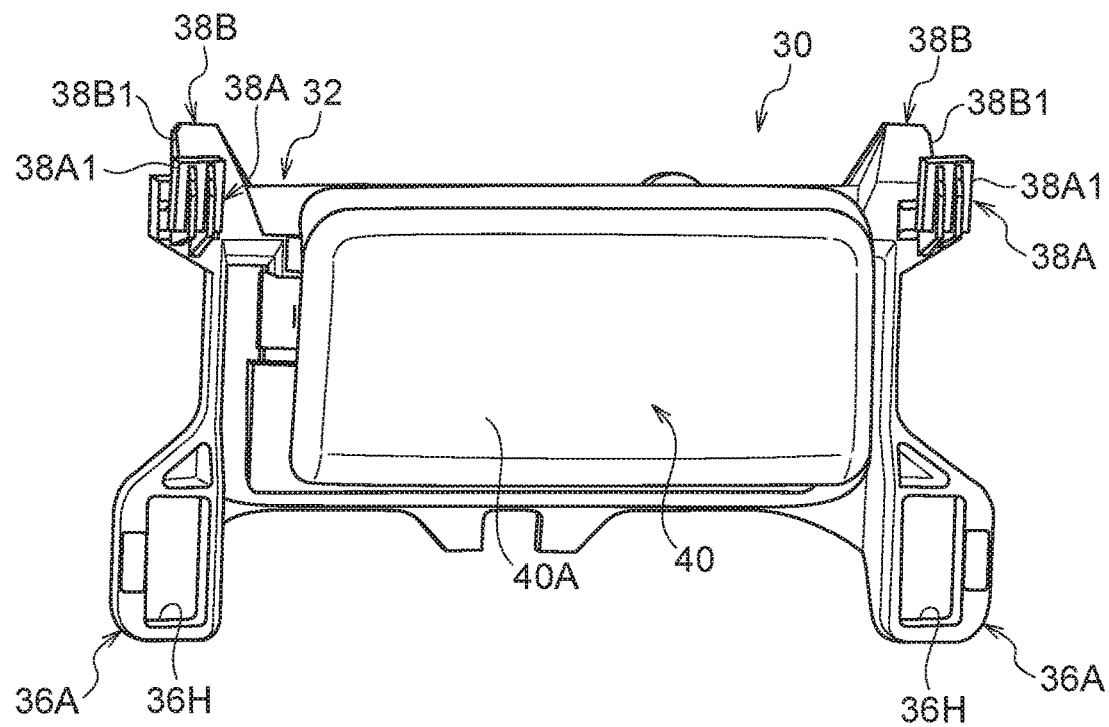
FIG. 3A is a perspective view illustrating the handle unit of FIG. 2, in a state as viewed from a design-face side of a handle.
Figure 3B:
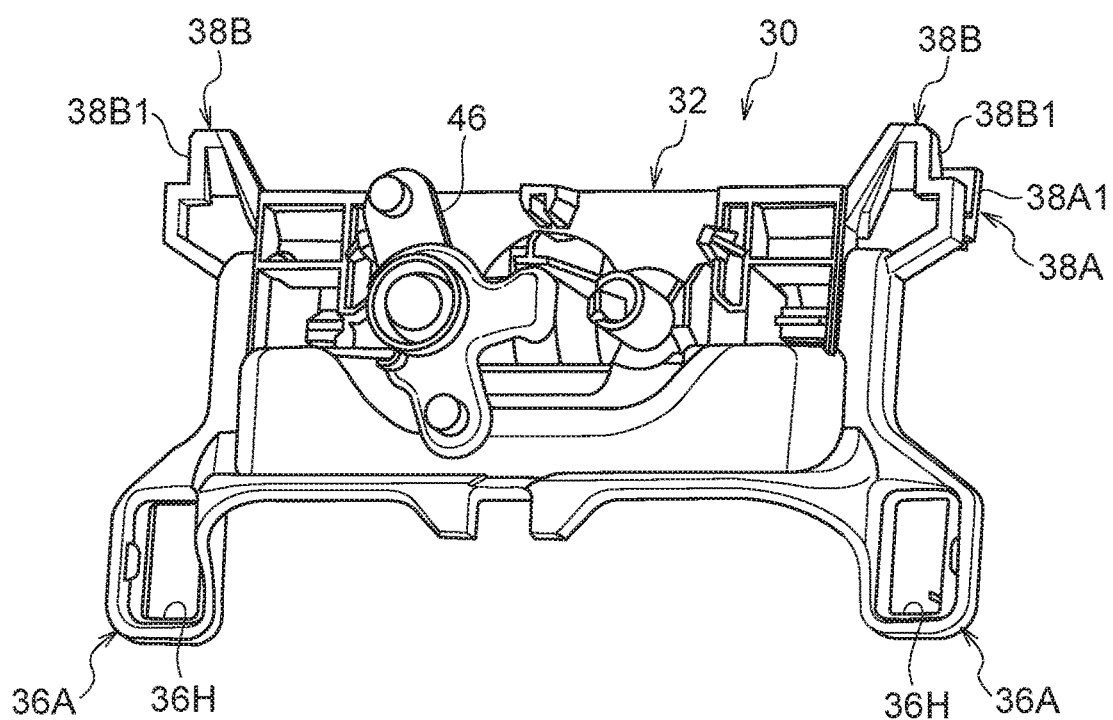
FIG. 3B is a perspective view illustrating the handle unit of FIG. 2, in a state as viewed from the opposite side to in FIG. 3A.

As illustrated in FIG. 1, a handle 40 (also referred to as a "door handle") configuring part of the handle unit 30 is disposed in the hole 20 of the outer door 14. FIG. 3A is a perspective view illustrating the handle unit 30 in a state viewed from a design face 40A side of the handle 40. FIG. 3B is a perspective view illustrating the handle unit 30 in a state viewed from the opposite side to in FIG. 3A. As illustrated in FIG. 3A, the handle unit 30 is provided with a base 32 supporting the handle 40. Note that in addition to the handle 40, components configuring part of a lock device, such as the link member 46 illustrated in FIG. 3B, are also attached to the base 32; however, explanation regarding assembly components other than the handle 40 (see FIG. 3A) is omitted here.

Figure 6:
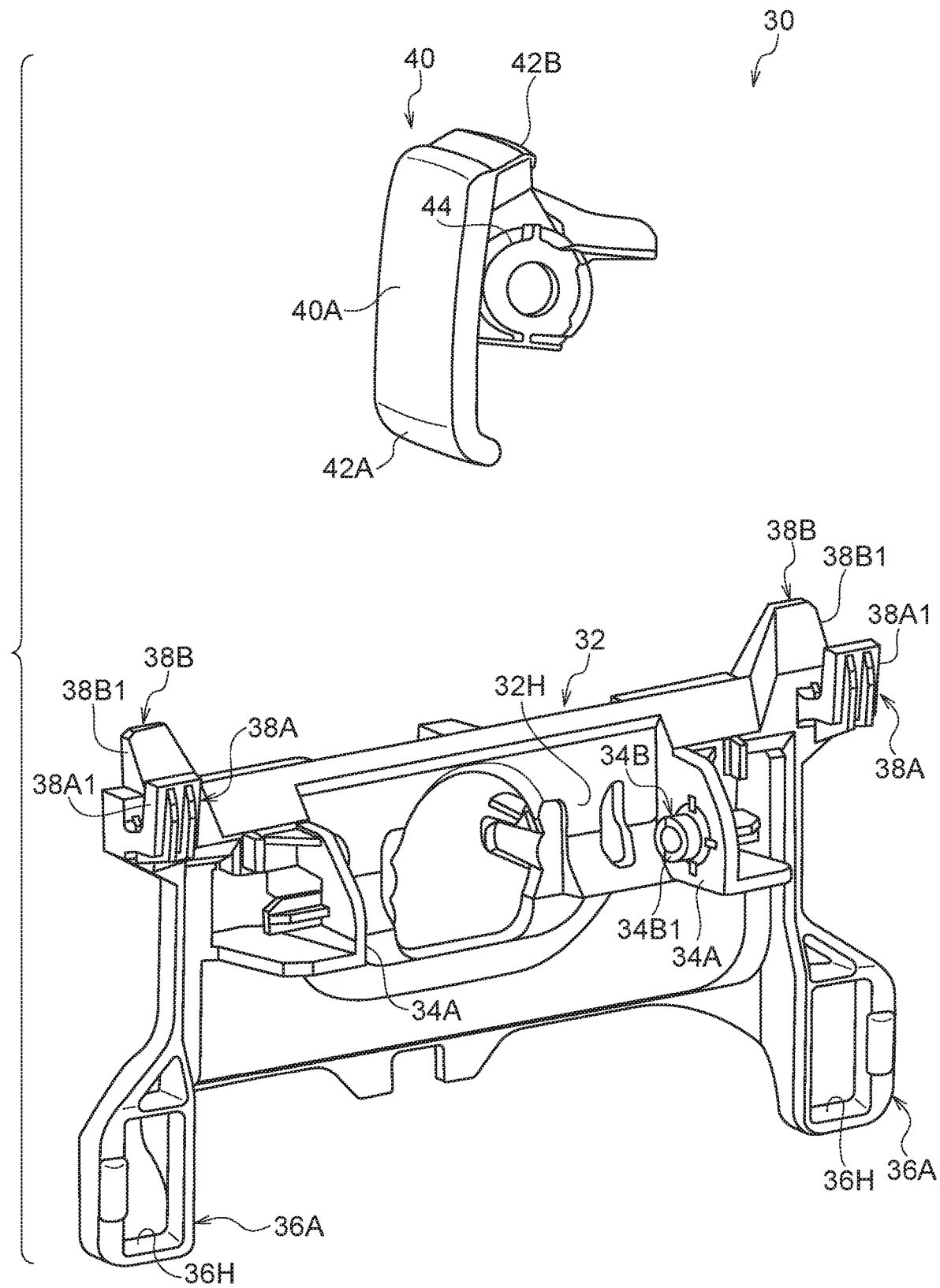
FIG. 6 is an exploded perspective view illustrating the base and handle of the handle unit of FIG. 3A in a disassembled state. The handle is illustrated in a different orientation than when assembled to the base.

FIG. 6 is an exploded perspective view illustrating the base 32 and the handle 40 of the handle unit 30 in a disassembled state. Note that in FIG. 6, the handle 40 is illustrated in a different orientation than when assembled to the base 32. As illustrated in FIG. 6, the handle 40 is provided with a finger pull 42A that extends out in a lever shape for an operator to hook a finger around, and an upper portion of the handle 40 is provided with a stopper 42B that protrudes toward the opposite side to the design face 40A side. Cylindrical shaft bearing portions 44 are formed at side portions on the two sides of the handle 40, with their axial directions oriented along the left-right direction of the handle 40.

Further, the base 32 is provided with a pair of left and right upright walls 34A that extend out from left and right sides on a fascia side of the base 32, and cylindrical shafts 34B projecting out toward the width direction inside of the base 32 are formed on the upright walls 34A. The outer diameter of the cylindrical shafts 34B is set to be very slightly smaller than the inner diameter of the cylindrical shaft bearing portions 44. On the end face on the opening side of each of the cylindrical shafts 34B, a portion configuring the side of the end face away from a body fascia face 32H of the base 32 (toward the near side of the page in the drawings) serves as a guide face 34B1. Each guide face 34B1 is slightly inclined toward the width direction outer side of the base 32 on progression toward the side away from the body fascia face 32H of the base 32.

Moreover, when the pair of left and right cylindrical shaft bearing portions 44 of the handle 40 are pressed in between the pair of left and right cylindrical shafts 34B of the base 32 during assembly of the handle 40, the cylindrical shafts 34B of the base 32 momentarily displace toward the opposite sides to their projection directions and then return to their original positions, such that the cylindrical shafts 34B of the base 32 are disposed inside the tubes of the cylindrical shaft bearing portions 44 of the handle 40. Accordingly, the handle 40 is supported so as to be capable of swinging about an axis running along the door left-right direction (about the cylindrical shafts 34B) with respect to the base 32, and the handle 40 is set so as to swing in the direction of pulling up when opening the door (when opening the door section including the outer door 14).

Figure 4B:
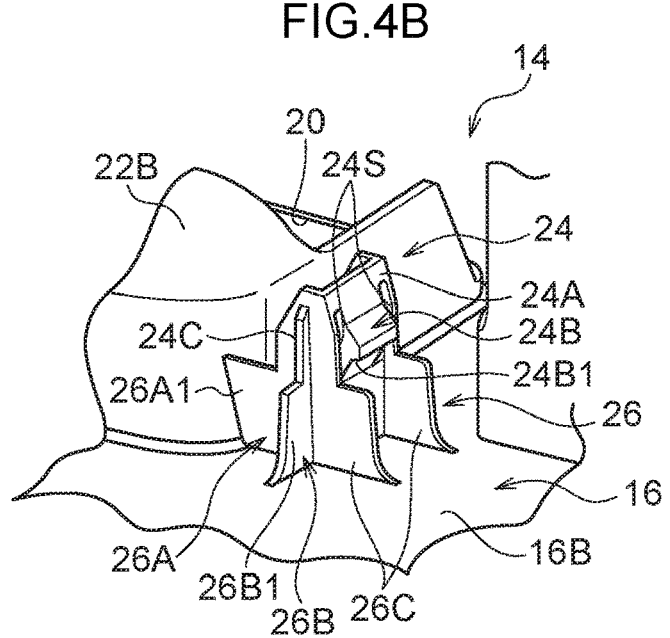
FIG. 4B is a perspective view illustrating part of the outer door of FIG. 4A, in a state as viewed from the arrow 4B direction.

FIG. 4B is a perspective view illustrating part of the outer door 14 in FIG. 4A in a state viewed from the arrow 4B direction. As illustrated in FIG. 4A and FIG. 4B, engagement claws 24 for assembling the handle unit 30 are formed on both sides (at the sides of the coupling wall 22B sides) of the lower portion of the hole 20, at locations on the back face 16B side of the outer door 14. The engagement claws 24 are provided with bent tabs 24A each formed in a shape forming three sides of a rectangle (a substantially U-shape) as viewed along a plate thickness direction of the outer door 14, and each engagement claw 24 is provided with an engagement protrusion 24B and engagement ribs 24C each integrated to the bent tab 24A. The engagement protrusion 24B projects out from an outer face of an intermediate tab configuring a door vertical direction intermediate portion of the bent tab 24A toward the opposite side to the coupling wall 22B side. Further, the engagement ribs 24C jut out in the door vertical direction from respective outer faces of two side tab portions configuring the two door vertical direction ends of the bent tabs 24A.

As illustrated in FIG. 4B, each engagement rib 24C extends in a direction projecting out from the back face 16B of the outer door general section 16. A leading end portion (upper portion in the drawings) of each bent tab 24A has a profile tapering in a direction away from the back face 16B side of the outer door general section 16, as viewed from the face formed with the engagement rib 24C. Further, slits 24S are formed in both sides of the engagement protrusion 24B of each bent tab 24A so as to extend in a similar direction to that of the engagement rib 24C. The engagement protrusion 24B is capable of displacing in the projection direction of the engagement protrusion 24B and in the opposite direction thereto. As viewed along the direction in which the pair of slits 24S are arranged side-by-side, the engagement protrusion 24B has an overall profile tapering toward its projection leading end side; however, a face at the projection leading end side and facing the back face 16B side of the outer door general section 16 configures a stopper face 24B1 parallel to the back face 16B of the outer door general section 16.

Note that as a modified example of the present exemplary embodiment, a face (step shaped face) may be formed to a face on the side of the engagement protrusion 24B closer to the outer door general section 16 than the projection leading end of the engagement protrusion 24B so as to connect between the stopper face 24B1 and an inclined face on a base end side (lower side in the drawings) of the engagement protrusion 24B together in substantially the extension direction of the slits 24S.

Figure 9A:
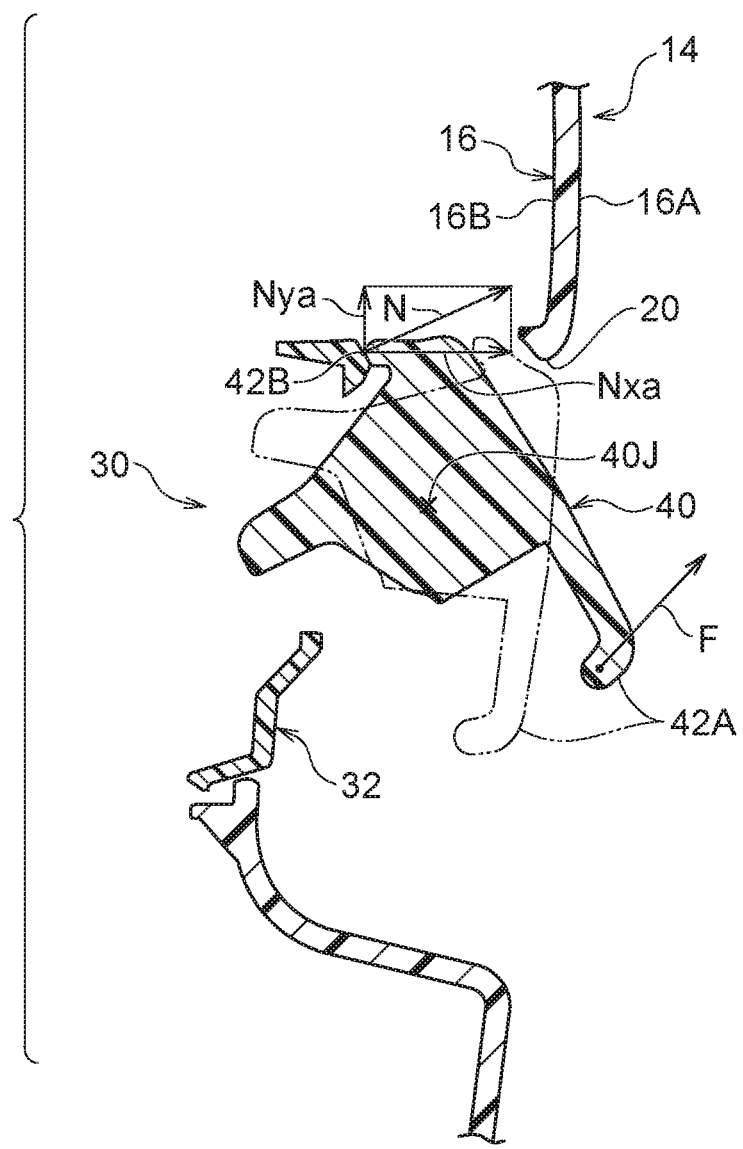
FIG. 9A is a vertical cross-section for explaining load acting on a handle when the handle is pulled up about a rotation axis, and illustrates a state sectioned along a cross-sectional position corresponding to line B-B in FIG. 5.
Figure 9B:
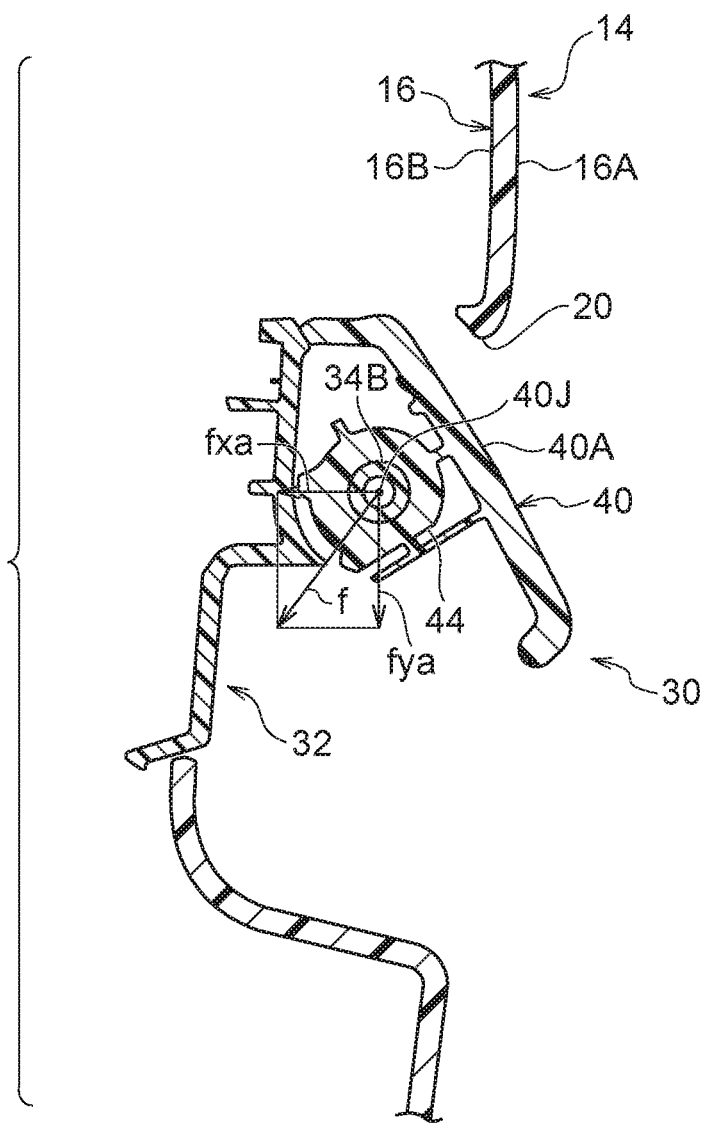
FIG. 9B is a vertical cross-section for explaining load acting on a handle when the handle is pulled up about a rotation axis, and illustrates a state sectioned along a cross-sectional position corresponding to line D-D in FIG. 5.

The engagement claws 24 are set further to the vehicle lower side than a rotation axis 40J of the handle 40 illustrated in FIGS. 9A and 9B, etc. Note that FIG. 9A and FIG. 9B illustrate the handle 40 in a state pulled up about the rotation axis 40J. FIG. 9A illustrates a state sectioned along a cross-sectional position corresponding to line B-B in FIG. 5, and FIG. 9B illustrates a state sectioned along a cross-sectional position corresponding to line D-D in FIG. 5.

FIG. 5 is a perspective view illustrating the handle unit 30 in a state assembled to the outer door 14, as viewed from the same direction as in FIG. 3B and FIG. 4A. As illustrated in FIGS. 3A and 3B and FIG. 5, substantially rectangular shaped engagement holes 36H are formed penetrating through respective overhang portions 36A jutting out downwards from respective left and right lower portions of the base 32 of the handle unit 30. As illustrated in FIG. 5, the engagement holes 36H of the handle unit 30 engage with the respective engagement claws 24 of the outer door 14.

Namely, a pair of release-side end portions 24A1 (end portions on the opposite side to the engagement protrusion 24B side) of the bent tabs 24A, the engagement protrusion 24B, and the engagement ribs 24C of the engagement claws 24 contact the inner face of the engagement hole 36H of the handle unit 30, to achieve a state in which the engagement claws 24 are fitted into (engaged with) the engagement holes 36H. To explain further, when each engagement claw 24 is inserted inside the respective engagement hole 36H during assembly of the handle unit 30, the engagement protrusion 24B is elastically deformed to the opposite side to the projection direction of the engagement protrusion 24B, a projection apex portion of the engagement protrusion 24B passes the inner face of the engagement hole 36H such that a base-end location of the engagement protrusion 24B that has elastically recovered is pressed against the inner face of the engagement holes 36H. The stopper face 24B1 of the engagement protrusion 24B of the engagement claws 24 illustrated in FIG. 4B contacts a part of the handle unit 30 on the peripheral edge of the engagement holes 36H.

Further, as illustrated in FIGS. 4A and 4B and FIG. 5, a base section 26 is formed on the back face 16B side of the outer door 14 so as to connect the outer door general section 16 and the respective engagement claw 24 together. As illustrated in FIG. 4B, each of the base sections 26 is provided with a bent base portion 26A formed so as to connect the bent tab 24A and the outer door general section 16 together, and a rib base portion 26B formed so as to connect the engagement rib 24C and the outer door general section 16 together.

The bent base portions 26A are configured including extension portions 26A1 that jut out from tab portions at both sides of the bent tabs 24A, as viewed in the plate thickness direction of the outer door general section 16. Further, each rib base portion 26B is configured including an extension portion 26B1 that juts out from the respective engagement rib 24C, as viewed in the plate thickness direction of the outer door general section 16. Moreover, each base section 26 is provided with rib shaped jutting out base portions 26C that project out from the two respective bent base portions 26A in the same direction as the engagement protrusion 24B. The end faces of the extension portion 26A1 of the bent base portion 26A, the extension portion 26B1 of the base section 26, and the jutting out base portion 26C facing in the same direction as the back face 16B of the outer door 14 are set so as to make contact with the peripheral edge of the engagement hole 36H of the handle unit 30 illustrated in FIG. 5 (see FIG. 10B).

Figure 10A:
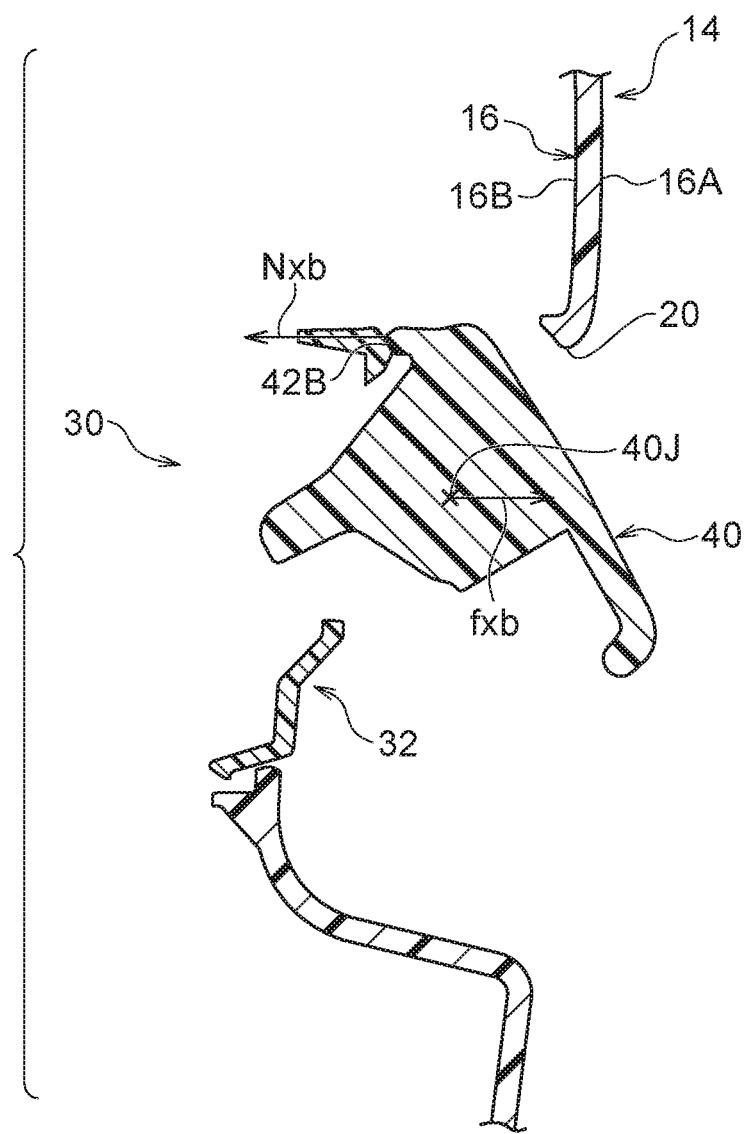
FIG. 10A is a vertical cross-section for explaining load acting on a base and an outer door when a handle is pulled up about a rotation axis, and illustrates a state sectioned along a cross-sectional position corresponding to line B-B in FIG. 5.
Figure 10B:
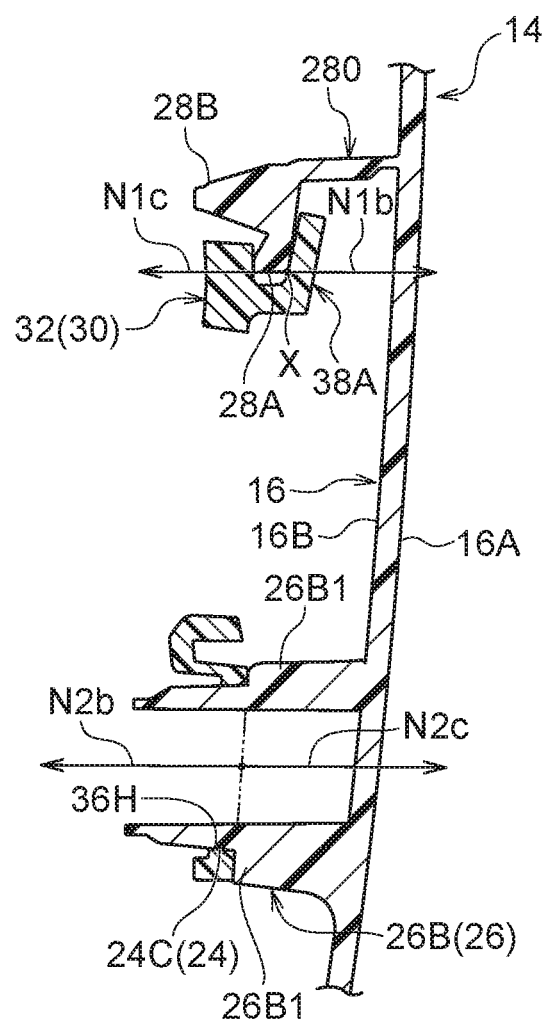
FIG. 10B is a vertical cross-section for explaining load acting on a base and an outer door when a handle is pulled up about a rotation axis, and illustrates a state sectioned along a cross-sectional position corresponding to line A-A in FIG. 5.

FIG. 10B is a vertical cross-section illustrating a state sectioned along a cross-sectional position corresponding to line A-A in FIG. 5. As illustrated in FIG. 3A and FIG. 10B, a left and right pair of substantially J-shaped hooks 38A are formed at side portions of the upper portion of the base 32 of the handle unit 30. The pair of left and right hooks 38A are set further to the vehicle upper side than the rotation axis 40J of the handle 40 illustrated in FIG. 10A, etc. Note that FIG. 10A is a vertical cross-section of a state sectioned along a cross-sectional position corresponding to line B-B in FIG. 5.

As illustrated in FIG. 4A and FIG. 10B, a pair of left and right hook anchors 28A are formed on the back face 16B side of the outer door 14, and the pair of left and right hooks 38A (see FIG. 10B) are anchored in the pair of left and right hook anchors 28A. The hook anchors 28A configure part of pedestal shaped pockets 280 that are provided extending out from the back face 16B side of the outer door general section 16 and that are open at the lower side (part of a location of the pockets 280, explained in more detail later, facing the outer door general section 16). Note that the distance from the rotation axis 40J of the handle 40 illustrated in FIG. 10A, etc. to the hook anchors 28A of the outer door 14 illustrated in FIG. 10B, etc. is set shorter than the distance from the rotation axis 40J of the handle 40 illustrated in FIG. 10A, etc. to the base sections 26 of the outer door 14 illustrated in FIG. 10B, etc.

Figure 7B:
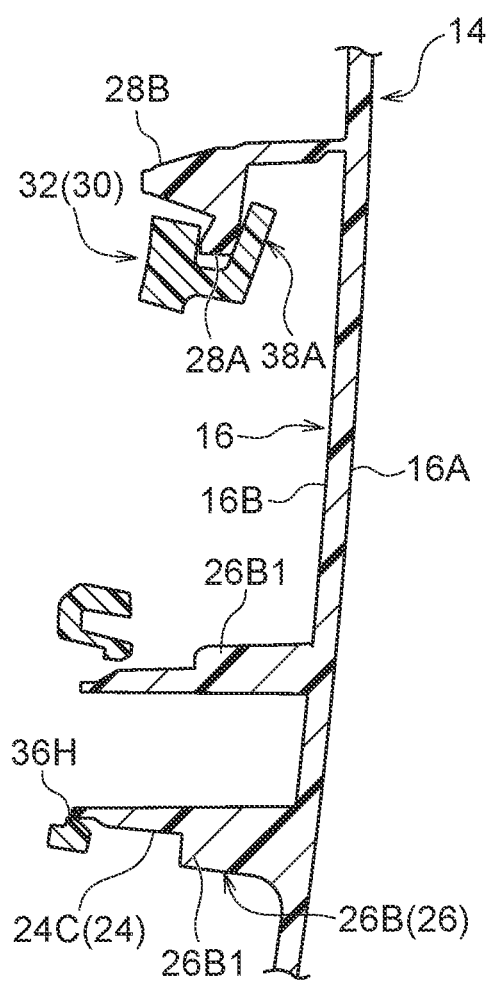
FIG. 7B is a vertical cross-section illustrating a displacement state of the handle unit when the handle unit is being assembled to an outer door, shown in a state sectioned along a cross-sectional position corresponding to line A-A in FIG. 5, and illustrates a state in which the handle unit has been rotationally moved to some degree from the state in FIG. 7A.
Figure 7C:
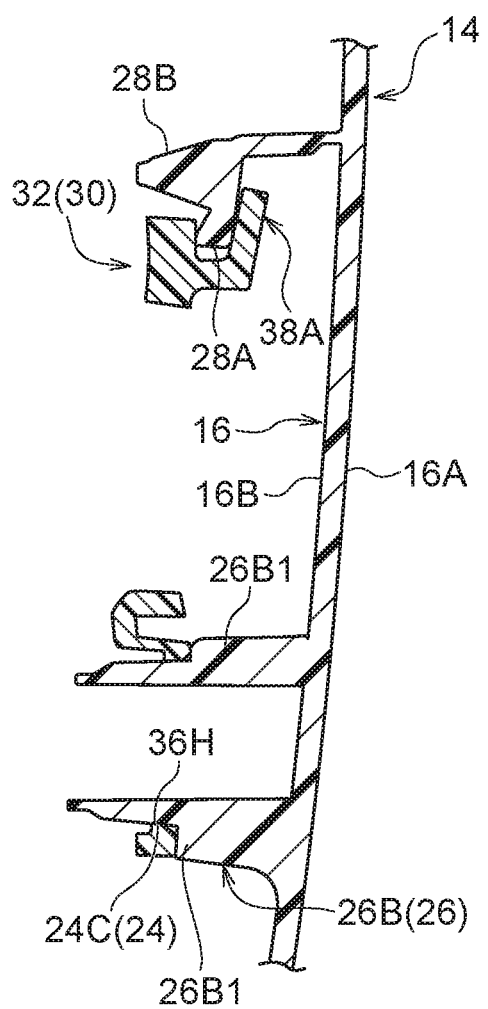
FIG. 7C is a vertical cross-section illustrating a displacement state of the handle unit when the handle unit is being assembled to an outer door, shown in a state sectioned along a cross-sectional position corresponding to line A-A in FIG. 5, and illustrates a state in which the handle unit has been further rotationally moved from the state in FIG. 7B, such that the handle unit has been assembled to the outer door.

FIG. 7A to FIG. 7C are vertical cross-sections illustrating displacement states of the handle unit 30 when the handle unit 30 is being assembled to the outer door 14, shown in a state sectioned along a cross-sectional position corresponding to line A-A in FIG. 5. In the present exemplary embodiment, as illustrated in FIG. 7A to FIG. 7C, the handle unit 30 is able to be rotationally moved while the pair of left and right hooks 38A illustrated in FIG. 3A are hooked into the pair of left and right hook anchors 28A illustrated in FIG. 4A. Note that FIG. 7A illustrates a state of attempting to rotationally move the handle unit 30 while hooking the hooks 38A into the hook anchors 28A. FIG. 7B illustrates a state in which the handle unit 30 has been rotationally moved to some degree from the state in FIG. 7A. Further, FIG. 7C illustrates a state in which the handle unit 30 has been further rotationally moved from the state in FIG. 7B, such that the handle unit 30 has been assembled to the outer door 14. As illustrated in FIG. 7C, configuration is made such that, as viewed from a side face of the door, the handle unit 30 is positioned in the extending direction of the outer door 14 (door vertical direction) with respect to the outer door 14 by anchoring the hooks 38A to the hook anchors 28A in an assembled orientation.

Note that the inside of the pockets 280 equipped with the hook anchors 28A illustrated in FIG. 4A are either not visible or are hard to see when in the assembled state. Accordingly, in consideration of ease of assembly, in the present exemplary embodiment, comparatively ample space is set for a gap in the width direction between the hooks 38A and the inside side-faces of the pockets 280 illustrated in FIG. 4A when hooking the hooks 38A illustrated in FIG. 7A into the hook anchors 28A.

As illustrated in FIG. 4A, at the back face 16B side of the outer door 14, there are a pair of left and right projections 28B integrally provided to the respective pair of left and right hook anchors 28A, and formed so as to project out in a direction away from the back face 16B side of the outer door 14. As illustrated in FIG. 3A and FIG. 3B, the base 32 of the handle unit 30 is formed with a pair of left and right overhang portions 38B that are integrally provided to the respective pair of left and right hooks 38A. The pair of left and right overhang portions 38B jut out from base ends of the hooks 38A toward the upper side in the vertical direction of the base 32. Outside side-faces 38B1 on the opposite sides of the pair of left and right overhang portions 38B to the mutually facing sides of the pair of left and right overhang portions 38B are set further to the inside in the left-right direction of the base 32 than outside side-faces 38A1 on the opposite side of the pair of hooks 38A to the mutually facing sides of the pair of hooks 38A.

As illustrated in FIG. 5, the pair of left and right overhang portions 38B are disposed between the pair of left and right projections 28B and are disposed adjacent to the pair of left and right projections 28B. Thus, a configuration is such that the handle unit 30 is positioned in the door left-right direction with respect to the outer door 14 by the pair of left and right projections 28B restricting displacement of the pair of left and right overhang portions 38B in the door left-right direction.

Operation and Effects of the Present Exemplary Embodiment

Explanation follows regarding operation and effects of the exemplary embodiment described above.

As illustrated in FIG. 1, the handle placement hole 20 is formed penetrating through the outer door 14, and the handle 40, which is supported by the base 32 (see FIG. 3A) of the handle unit 30, is placed in the hole 20 of the outer door 14. The engagement claws 24 are formed at locations on the back face 16B side of the outer door 14 illustrated in FIG. 4A, and the engagement holes 36H that engage with the engagement claws 24 (see FIG. 4A) are formed penetrating through the base 32 of the handle unit 30 illustrated in FIG. 3. Accordingly, when assembling the handle unit 30 to the outer door 14 illustrated in FIG. 5, the handle unit 30 can be assembled from the back face 16B side of the outer door 14, and there is no need to flip over the outer door 14. Note that the structure of the present exemplary embodiment may be said to be a structure that also enables efficient assembly from the viewpoint that other assembly components (such as the box body 12 (see FIG. 1) and a non-illustrated latch) are also assembled from the back face 16B side of the outer door 14 (namely, from the same side as when assembling the handle unit 30).

Further, the pair of left and right hooks 38A formed to the base 32 of the handle unit 30 illustrated in FIG. 3A are anchored in the pair of left and right hook anchors 28A formed on the back face 16B side of the outer door 14 illustrated in FIG. 4A. Further, in the present exemplary embodiment, as illustrated in FIG. 7A to FIG. 7C, the handle unit 30 is able to be rotationally moved while hooking the pair of left and right hooks 38A illustrated in FIG. 3A into the pair of left and right hook anchors 28A. Moreover, as illustrated in FIG. 7C, configuration is made such that, as viewed from a side face of the door, the handle unit 30 is positioned in the extending direction of the outer door 14 (door vertical direction) with respect to the outer door 14 by anchoring the hooks 38A into the hook anchors 28A in the assembled orientation. Namely, when assembling the handle unit 30 to the outer door 14, the handle unit 30 is rotationally moved while hooking the pair of left and right hooks 38A into the pair of left and right hook anchors 28A, enabling the handle unit 30 to be assembled to the outer door 14, thereby giving good assembly operation performance.

Further, in the present exemplary embodiment, as illustrated in FIG. 4A, the projections 28B, which are integrally provided to the respective pair of left and right hook anchors 28A, are formed to the outer door 14 as a left and right pair, and, as illustrated in FIG. 3A, the overhang portions 38B, which are integrally provided to the respective pair of left and right hooks 38A, are formed to the base 32 of the handle unit 30 as a left and right pair. Further, as illustrated in FIG. 5, the pair of left and right overhang portions 38B of the handle unit 30 are disposed between the pair of left and right projections 28B of the outer door 14 and are disposed adjacent to the pair of left and right projections 28B. Thus, configuration is such that the handle unit 30 is positioned in the door left-right direction with respect to the outer door 14 by the pair of left and right projections 28B restricting displacement of the pair of left and right overhang portions 38B in the door left-right direction. Thus, when assembling the handle unit 30 to the outer door 14, the pair of left and right overhang portions 38B are disposed between the pair of left and right projections 28B, which are easy to see from the back side of the outer door 14, enabling the hooks 38A (see FIG. 7) to be hooked into the hook anchors 28A and the handle unit 30 to be positioned in the door left-right direction with respect to the outer door 14.

As explained above, the vehicle storage section door structure of the present exemplary embodiment enables a reduction in assembly time to assemble the handle unit 30 to the outer door 14 (in other words, in the cycle time during manufacture). Further, the handle unit 30 can be assembled to the outer door 14 without using screws (for example, screws and the like).

Figure 8A:
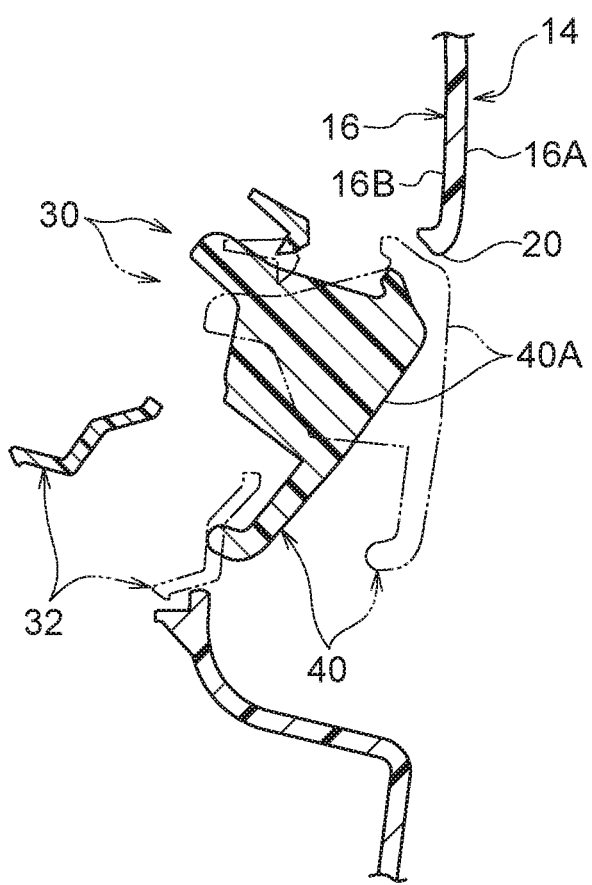
FIG. 8A is a vertical cross-section illustrating a displacement state of a handle unit in a state sectioned along a cross-sectional position corresponding to line B-B in FIG. 5 when the handle unit is being assembled to the outer door.
Figure 8B:
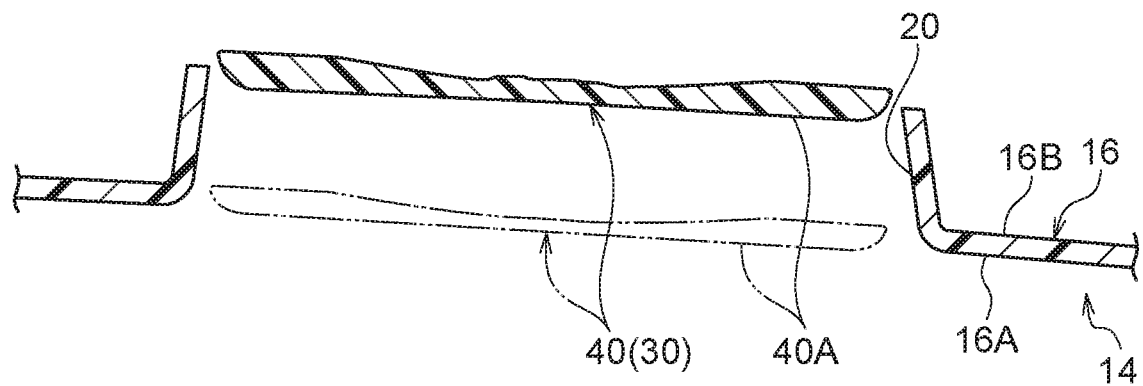
FIG. 8B is a cross-section illustrating a displacement state of a handle when a handle unit is being assembled to an outer door, taken in a state sectioned along a cross-sectional position corresponding to line C-C in FIG. 5.

Additional explanation from other perspectives follows, with reference to FIG. 8A and FIG. 8B. FIG. 8A is a vertical cross-section illustrating a displacement state of the handle unit 30 in a state sectioned along a cross-sectional position corresponding to line B-B in FIG. 5 when the handle unit 30 is being assembled to the outer door 14. In FIG. 8A, the handle 40 and the base 32 are illustrated by solid lines and double-dotted dashed lines. The solid lines illustrate a position at the same timing as that of FIG. 7A, and the double-dotted dashed lines illustrate a position at the same timing as that of FIG. 7C (i.e. position in the assembled state). FIG. 8B is a cross-section illustrating a displacement state of the handle 40 when the handle unit 30 is being assembled to the outer door 14, taken in a state sectioned along a cross-sectional position corresponding to line C-C in FIG. 5. In FIG. 8B, the handle 40 is illustrated by solid lines and double-dotted dashed lines. The solid lines illustrate a position at the same timing as that of FIG. 7A, and the double-dotted dashed lines illustrate a position at the same timing as that of FIG. 7C (i.e. position in the assembled state).

As described above, during assembly, the handle unit 30 is positioned in the extending direction of the outer door 14 (in the door vertical direction) by the hook anchors 28A and the hooks 38A illustrated in FIGS. 7A and 7B, as viewed from the side face of the door, and the handle unit 30 is positioned in the door left-right direction by the projections 28B and the overhang portions 38B illustrated in FIG. 5. Thus, as illustrated in FIG. 8A and FIG. 8B, when assembling the handle unit 30, the handle unit 30 is assembled smoothly along a predetermined assembly trajectory without the design face 40A of the handle 40 impinging (contacting) the edges of the hole 20 of the outer door 14. Accordingly, this enables damage to the design face 40A of the handle 40 to be prevented even when the handle unit 30 is assembled from the back face 16B side of the outer door 14.

The present exemplary embodiment includes an anchoring structure configured by the hook anchors 28A and the hooks 38A illustrated in FIG. 10B, a door left-right direction position restriction structure configured by the projections 28B and the overhang portions 38B illustrated in FIG. 5, an engagement structure configured by the engagement claws 24 and the engagement holes 36H, and an abutting structure configured by the base sections 26 and the peripheral edges of the engagement holes 36H. These structures result in the handle unit 30 being stably retained on the outer door 14, and prevent or effectively suppress the handle unit 30 from rattling or from coming away from the outer door 14 when the handle 40 (see FIG. 9A, etc.) is operated.

The handle 40 illustrated in FIG. 1 swings in a pull-up direction about an axis running along the door left-right direction when the door is opened. The engagement claws 24 illustrated in FIG. 5 are set so as to be further toward the vehicle lower side than the rotation axis 40J of the handle 40 illustrated in FIG. 9, etc. Further, as illustrated in FIG. 5, the base sections 26 are formed on the back face 16B side of the outer door 14, and the base sections 26 connect the outer door general section 16 and the engagement claws 24 together, with the peripheral edges of the engagement holes 36H contacting the base sections 26. Thus, when the handle 40 is pulled up about the axis running along the door left-right direction as illustrated in FIG. 9, load acts on the handle unit 30 in a pressing direction from the peripheral edges of the engagement holes 36H toward the base sections 26, as illustrated in FIG. 10B. Thus, as a result of providing the base sections 26, the outer door 14 is less liable to deform under load in the pressing direction and durability is improved compared to cases in which the base sections 26 are not provided.

Explanation follows regarding a case in which the handle 40 illustrated in FIG. 9A is pulled up with excessive force, with reference to FIGS. 9A and 9B and FIGS. 10A and 10B.

First, explanation follows regarding load acting on the handle 40, with reference to FIGS. 9A and 9B. As illustrated in FIG. 9A, when the finger pull 42A of the handle 40 is pulled up from the position illustrated by double-dotted dashed lines to the position illustrated by solid lines with an excessive force F, the stopper 42B of the handle 40 hits the base 32, and a push-back force N from the base 32 acts on the stopper 42B. Further, when this occurs, push-back force f from the cylindrical shafts 34B of the base 32 illustrated in FIG. 9B acts on the cylindrical shaft bearing portions 44 of the handle 40. Note that in FIG. 9A, the horizontal-direction force component of force N is indicated by Nxa, and the vertical-direction force component of force N is indicated by Nya. In FIG. 9B, the horizontal-direction force component of force f is indicated by fxa, and the vertical-direction force component of force f is indicated by fya.

Explanation follows regarding load in the horizontal direction acting on the base 32, with reference to FIGS. 10A and 10B. FIG. 10A illustrates a state at the same timing as that in FIG. 9A. Force fxb (a force having the same magnitude as and in the opposite direction to force fxa indicated in FIG. 9B) from the rotation axis 40J side of the handle 40 illustrated in FIG. 10A acts on the cylindrical shafts 34B (see FIG. 9B) of the base 32. Further, force Nxb (a force having the same magnitude as and in the opposite direction to force Nxa indicated in FIG. 9A) from the stopper 42B of the handle 40 illustrated in FIG. 10A acts on the base 32. Further, when this occurs, force N1b from the hook anchors 28A of the outer door 14 illustrated in FIG. 10B acts so as to push back against the hooks 38A of the base 32. Note that in order to make the arrow N1b more visible in the drawing, the start point of arrow N1b is indicated by reference sign X. Further, as illustrated in FIG. 10B, force N2b from the base sections 26 of the outer door 14 acts so as to push back against the peripheral edges of the engagement holes 36H of the base 32.

Explanation follows regarding horizontal direction load acting on the outer door 14, with reference to FIG. 10B. A pulling force N1c (a force having the same magnitude as and in the opposite direction to the force N1b) from the hooks 38A of the base 32 illustrated in FIG. 10B acts on the hook anchors 28A of the outer door 14. Note that in the drawings, the start point of arrow N1c is indicated by reference sign X. Further, in the drawings, a line indicating the lower end of the hook anchors 28A is illustrated as being superimposed on part of a straight line portion of arrow N1c. Further, as illustrated in FIG. 10B, a pushing force N2c (a force having the same magnitude as and in the opposite direction to force N2b) from the peripheral edges of the engagement holes 36H of the base 32 acts on the base sections 26 of the outer door 14.

However, as described above: the hooks 38A illustrated in FIG. 10B, etc. are set further to the vehicle upper side than the rotation axis 40J of the handle 40 illustrated in FIG. 10A, etc.; and the distance from the rotation axis 40J of the handle 40 to the hook anchors 28A illustrated in FIG. 10B, etc. is set shorter than the distance from the rotation axis 40J of the handle 40 illustrated in FIG. 10A, etc. to the base sections 26 illustrated in FIG. 10B, etc. Thus, in cases in which the handle 40 illustrated in FIG. 10A is pulled up about the rotation axis 40J, this enables load from the peripheral edges of the engagement holes 36H of the handle unit 30 acting on the base sections 26 of the outer door 14 to be made larger than the load from the hooks 38A of the handle unit 30 illustrated in FIG. 10B acting on the hook anchors 28A of the outer door 14. Accordingly excessive load can be suppressed from acting on the hooks 38A and the hook anchors 28A.

Figure 11:
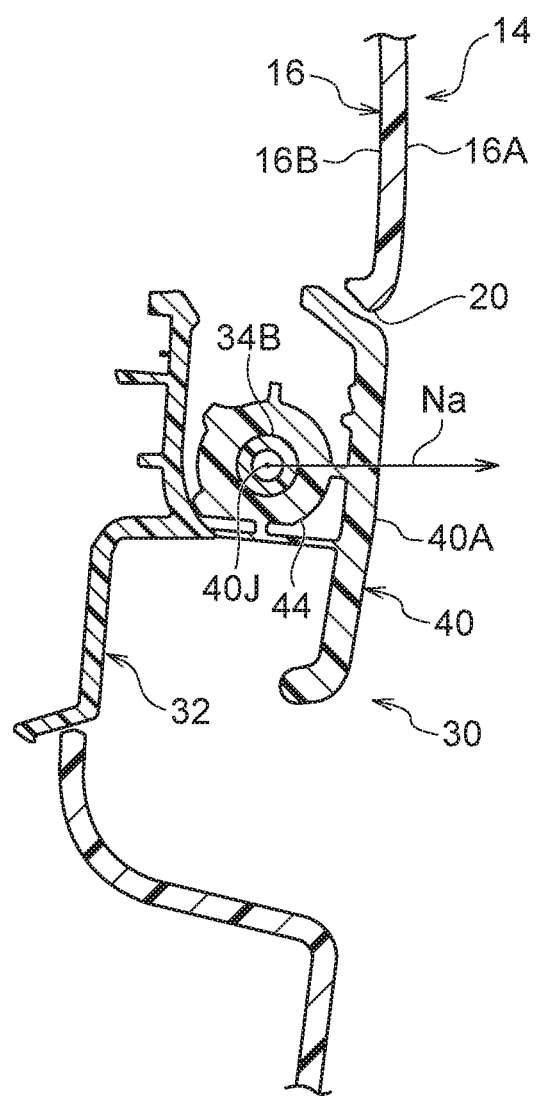
FIG. 11 is a vertical cross-section for explaining load acting on handle and a base when the handle has been pushed with excessive force, in a state sectioned along a cross-sectional position corresponding to line D-D in FIG. 5.

Next, explanation follows regarding cases in which the handle 40 illustrated in FIG. 11, etc. is pushed with excessive force from the design face 40A side, by way of explanation using FIG. 9B and FIG. 10B while referencing FIG. 11. Note that FIG. 11 is a vertical cross-section illustrating a state in which the handle 40 has been pushed with excessive force from the design face 40A side, in a state sectioned along a cross-sectional position corresponding to line D-D in FIG. 5.

In cases in which the handle 40 in the position illustrated in FIG. 9B becomes as in the state illustrated in FIG. 11 by being pushed with excessive force from the design face 40A side of the handle 40, a push-back force Na from the cylindrical shafts 34B of the base 32 acts on the cylindrical shaft bearing portions 44 of the handle 40. When this occurs, by way of explanation using FIG. 10B, a force from the hooks 38A of the base 32 acts on the hook anchors 28A of the outer door 14 in the same direction as arrow N1c, and a force from the peripheral edges of the engagement holes 36H of the base 32 acts on the engagement claws 24 (see FIG. 5) of the outer door 14 in the same direction as arrow N2b. In response thereto, the outer door 14 is able to bear the loads using the hook anchors 28A and the engagement claws 24 (see FIG. 5), and so the handle unit 30 does not easily come out from the outer door 14.

In this manner, in the present exemplary embodiment, even when the handle 40 illustrated in FIGS. 9A and 9B, etc. is pulled up with excessive force or the handle 40 is pushed with excessive force from the design face 40A side, the handle unit 30 is prevented or effectively suppressed from rattling or coming away from the outer door 14.

Supplementary Explanation of Present Exemplary Embodiment

Note that in the exemplary embodiment above, the engagement claws 24 are formed at locations on the back face 16B side of the outer door 14 illustrated in FIG. 5, and the engagement holes 36H are formed penetrating through the base 32 of the handle unit 30. However, as a modified example of the exemplary embodiment above, a configuration may be adopted in which engagement claws are formed to a base (32) of a handle unit (30), and engagement holes to engage with the engagement claws are formed penetrating through locations on a back face (16B) side of an outer door (14) (locations formed with pedestal shapes, for example).

As a modified example of the exemplary embodiment above, instead of the hooks 38A and the overhang portions 38B illustrated in FIG. 3A, configuration sections may be provided that are similar to the overhang portions 36A formed with the engagement holes 36H penetrating through, and instead of the pockets 28O and the projections 28B provided with the hook anchors 28A illustrated in FIG. 4A, configuration sections may be provided that are similar to the base sections 26 and the engagement claws 24. Namely, a configuration may be adopted in which engagement claws (24) and engagement holes (36H, (see FIG. 3)) engage with each other at a total of four locations, these being at the top, bottom, left, and right of the peripheral edges of a hole (20) of an outer door (14).

Further, in the exemplary embodiment above, configuration was such that the hooks 38A are anchored in the hook anchors 28A illustrated in FIG. 7C in the assembled orientation such that the handle unit 30 is positioned in the extending direction of the outer door 14 (door vertical direction) with respect to the outer door 14, as viewed from a side face of the door. However, as a modified example of the exemplary embodiment above, a configuration may be adopted in which hooks (38A) are anchored in hook anchors (28A) in the assembled orientation so as to position a handle unit (30) with respect to the outer door (14) in both an extending direction of an outer door (14) (door vertical direction), as viewed from a side face of the door, and in the door left-right direction. Namely, although less convenient than in the exemplary embodiment above from the view-point of assembly performance, a configuration may be adopted in which projections (28B) are not provided, and tiny gaps in the width direction are set between hooks (38A) and respective inside side-faces of pockets (28O, (see FIG. 4A)) when the hooks (38A) are hooked into hook anchors (28A).

Further, in the exemplary embodiment above, the base sections 26 are formed on the outer door 14, and a configuration such as this is useful. However, as a modified example of the exemplary embodiment above, configuration may be adopted in which engagement claws (24 (see FIGS. 4A and 4B)) not formed with base sections (26) are formed on a back face (16B) side of an outer door (14).

Further, in the exemplary embodiment above, the distance from the rotation axis 40J of the handle 40 illustrated in FIG. 10A, etc. to the hook anchors 28A of the outer door 14 illustrated in FIG. 10B, etc. is set shorter than the distance from the rotation axis 40J of the handle 40 illustrated in FIG. 10A, etc. to the base sections 26 of the outer door 14 illustrated in FIG. 10B, etc. However, the relationship between the distance from a rotation axis (40J) of a handle (40) to hook anchors (28A) and the distance from the rotation axis (40J) of the handle (40) to base sections (26) is not limited to the example in the exemplary embodiment above.

Further, in the exemplary embodiment above, explanation has been given of an example of a door structure in which the vehicle storage section is the glovebox 10; however, the vehicle storage section door structure of the present disclosure may be a door structure of a different vehicle storage section, such as a storage box on a driver-seat-facing side. Moreover, as a modified example of the exemplary embodiment above, a structure may be adopted in which a door panel that is able to be opened and closed is disposed in the opening of the box section of the vehicle storage section.

Note that appropriate combinations of the exemplary embodiment above and the modified examples described above may be implemented.

Explanation has been given above of an example of the present disclosure; however, the present disclosure is not limited to the above, and obviously various other modifications may be implemented within a range not departing from the spirit of the disclosure.

What is claimed is:

1. A door structure for a vehicle storage section, the door structure comprising:
   a door panel that is provided at an opening and closing section of a vehicle storage section, the door panel including a hole for handle placement penetrating through the door panel, a pair of left and right hook anchors are formed on a back-face side of the door panel, a pair of left and right projections are formed on the back-face side of the door panel, the pair of left and right projections being integrally provided at each of the pair of left and right hook anchors and projecting out in a direction toward the side away from the back-face side of the door panel; and
   a handle unit that includes
      a handle that is configured to be disposed in the hole of the door panel, and
      a base that supports the handle, a pair of left and right hooks are formed at the base of the handle unit, the pair of left and right hook anchors anchor the pair of left and right hooks, a pair of left and right overhang portions are formed at the base of the handle unit, the pair of left and right overhang portions being integrally provided at each of the pair of left and right hooks, and being disposed between the pair of left and right projections and adjacent to the respective projection of the pair of left and right projections;
   wherein an engagement claw is formed at one of a location on the back-face side of the door panel or the base of the handle unit, and an engagement hole that engages with the engagement claw penetrates through the other of the location on the back-face side of the door panel or the base of the handle unit;
   wherein the handle unit is configured so as to be able to be rotationally moved while hooking the pair of left and right hooks into the pair of left and right hook anchors, and such that anchoring the hooks in the hook anchors in an assembled orientation positions the handle unit in at least an extending direction of the door panel with respect to the door panel, as viewed from a side face of the door panel; and
   wherein the handle unit is positioned in a door left-right direction with respect to the door panel by the pair of left and right projections restricting displacement of the pair of left and right overhang portions in the door left-right direction.

2. The vehicle storage section door structure of claim 1, wherein:
   the handle is supported so as to be capable of swinging with respect to the base about an axis running along a door left and right direction, and the handle is set so as to swing in a direction of pulling up when opening the door;
   the engagement claw is formed at a location on the back-face side of the door panel, and the engagement claw is further toward a vehicle lower side than a rotation axis of the handle; and
   a base section is formed on the back-face side of the door panel, the base section connecting a general section of the door panel and the engagement claw together and including a location to contact a peripheral edge of the engagement hole.

3. The vehicle storage section door structure of claim 2, wherein the hooks are further toward a vehicle upper side than the rotation axis of the handle, and a distance from the rotation axis of the handle to the hook anchors is shorter than a distance from the rotation axis of the handle to the base section.

4. A door structure for a vehicle storage section, the door structure comprising:
   a door panel that is provided at an opening and closing section of a vehicle storage section, the door panel including a hole for handle placement penetrating through the door panel; and
   a handle unit that includes
      a handle that is configured to be disposed in the hole of the door panel, and
      a base that supports the handle;
   wherein an engagement claw is formed at a location on a back-face side of the door panel, and an engagement hole that engages with the engagement claw penetrates through the base of the handle unit, the engagement claw is further toward a vehicle lower side than a rotation axis of the handle;
   wherein the handle is supported so as to be capable of swinging with respect to the base about an axis running along a door left and right direction, and the handle is set so as to swing in a direction of pulling up when opening the door; and
   wherein a base section is formed on the back-face side of the door panel, the base section connecting a general section of the door panel and the engagement claw together and including a location to contact a peripheral edge of the engagement hole.

* * * * *